United States Patent [19]

Eller

[11] Patent Number: 5,015,399
[45] Date of Patent: May 14, 1991

[54] METHOD, SYSTEM, SHIP AND COLLECTING DEVICE FOR OIL SPILL RECOVERY

[75] Inventor: J. David Eller, Deerfield Beach, Fla.

[73] Assignee: M & W Pump Corporation, Deerfield Beach, Fla.

[21] Appl. No.: 431,395

[22] Filed: Nov. 3, 1989

[51] Int. Cl.$^5$ .............................................. E02B 15/04
[52] U.S. Cl. ................................ 210/776; 210/242.3; 210/258; 210/923
[58] Field of Search ..................... 210/242.3, 258, 259, 210/521, 776, 923

[56] References Cited

U.S. PATENT DOCUMENTS

| | | | |
|---|---|---|---|
| 61,880 | 2/1867 | Serrell | 210/242.3 |
| 2,891,672 | 6/1959 | In't Veld et al. | 210/242.3 |
| 3,219,190 | 11/1965 | Thune | 210/242.3 |
| 3,251,330 | 5/1966 | Honegger | 114/147 |
| 3,303,932 | 2/1967 | Hirs et al. | 210/776 |
| 3,529,720 | 9/1970 | Chablaix | 210/776 |
| 3,547,553 | 12/1970 | Stanfield | 210/242.3 |
| 3,684,095 | 8/1972 | Ayers | 210/242.3 |
| 3,688,506 | 9/1972 | Marcocchio | 210/242.3 |
| 3,693,801 | 9/1972 | Pogonowski | 210/242.3 |
| 3,722,687 | 3/1973 | Stebbins et al. | 210/923 |
| 3,722,688 | 3/1973 | Wirsching | 210/242.3 |
| 3,730,346 | 5/1973 | Prewitt | 210/242.3 |
| 3,771,662 | 11/1973 | Muramatsu et al. | 210/242.3 |
| 3,830,370 | 8/1974 | Glaeser et al. | 210/776 |
| 3,836,004 | 9/1974 | Favret | 210/776 |
| 3,844,944 | 10/1974 | Mercuri | 210/242.3 |
| 3,847,816 | 11/1974 | DiPerna | 210/242.3 |
| 3,907,463 | 9/1975 | Eller et al. | 417/372 |
| 3,970,556 | 7/1976 | Gore | 210/776 |
| 4,116,833 | 9/1978 | Stagemeyer et al. | 210/776 |
| 4,133,765 | 1/1979 | Stupica | 210/242.3 |
| 4,139,470 | 2/1979 | Stagemeyer et al. | 210/170 |
| 4,142,972 | 3/1979 | Nebeker et al. | 210/242.3 |
| 4,146,477 | 3/1979 | Challener | 210/242.4 |
| 4,182,679 | 1/1980 | Van Hekle | 210/923 |
| 4,208,978 | 6/1980 | Eller | 417/360 |
| 4,209,400 | 6/1980 | Mayes | 210/776 |
| 4,223,625 | 9/1980 | Puretic | 114/147 |
| 4,310,415 | 1/1982 | Webb | 210/242.3 |
| 4,350,476 | 9/1982 | Eller | 417/390 |
| 4,356,086 | 10/1982 | Oberg | 210/242.3 |
| 4,388,188 | 6/1983 | Morris | 210/242.3 |
| 4,510,054 | 4/1985 | Wylie | 210/242.3 |
| 4,669,972 | 6/1987 | Koblanski | 210/923 |
| 4,818,399 | 4/1989 | Midkiff | 210/242.3 |
| 4,882,073 | 11/1989 | Griffith | 210/776 |

FOREIGN PATENT DOCUMENTS 5411 11/1979 European Pat. Off. .

Primary Examiner—Stanley Silverman
Assistant Examiner—Christopher Upton
Attorney, Agent, or Firm—Vorys, Sater, Seymour & Pease

[57] ABSTRACT

There are disclosed a method of and system including a ship for recovery of oil from an oil spill. The system includes an ocean-going ship having a floating intake device with large submersible pumps; a clarifier system in the ship for separating the oil form the water; a discharge system for discharging the separated water; a bow thruster for laterally positioning the bow; a plurality of other vessels using floatable oil recovery booms for containing the spill and urging it toward the oil recovery ship, and pumps for pumping the processed oil back to shore or to another ship.

35 Claims, 3 Drawing Sheets

METHOD, SYSTEM, SHIP AND COLLECTING DEVICE FOR OIL SPILL RECOVERY

BACKGROUND OF THE INVENTION

The present invention is directed toward a method, system, ship and collecting device for oil spill recovery.

With the larger oil tankers of today great quantities of thick black crude oil can be released into the water should the oil tanker experience an accident. Accordingly, several million gallons of crude oil can spread over the water. Currents can carry the contaminating oil out to sea and to hundreds of miles of coastline. Oil spills can produce devastating damage to coastlines, fisheries and kill tens of thousands of animals.

Oil is not easy to clean up as can be evidenced by recent disasters. Moreover, it is important to start cleaning up a spill immediately before the oil has a chance to spread.

There have been numerous proposals to recover oil from a spill on the water. One approach is to use chemical dispersents which break down the oil into tiny pieces. However, there is a body of evidence to suggest that such dispersents may harm ocean life. Other approaches include using booms which are floating sausage-like members with skirts that hang a few feet below the surface. They can be towed by ships to corral the pancake-like floating oil. Subsequently, skimmer devices then collect the oil by sucking or scooping it up.

Exemplary of other known prior art approaches include those described in the following U.S. Patent Nos.: 3,251,330; 4,182,679; 3,693,801; 4,209,400; 3,730,346; 4,223,625; 3,844,944; 4,356,086; 3,847,816; 4,388,188; 4,116,833; 4,818,399; 3,722,688; 4,142,972; 3,836,004; 4,510,054 and 3,970,556. As noted, an oil spill is subject to currents and sometimes the oil will move toward the open ocean which makes its recovery by known skimmer devices difficult because of wave action, particularly with rolling seas. In situations where there are several million gallons of spilled oil, the heretofore known devices used are inadequate. Unfortunately, present human efforts will generally get rid of about 10 percent of the oil from an oil spill.

Accordingly, there is an ongoing need to provide for an oil recovery method, system including a vessel and collecting apparatus wherein oil spills may be easily and quickly contained and recovered.

SUMMARY OF THE INVENTION

According to the present invention there is provided an improved method of and system including a surface vessel for removing floating contaminant from the surface of a body of water. In this regard, the surface vessel is propellable on a body of water, and defines a reservoir means for receiving the contaminant and water introduced thereinto. Operatively connected to the surface vessel is a floatable water/contaminant collecting means including intake means being automatically maintainable in a position for allowing intake of a water/contaminant mixture. Also included is submersible pumping means associated with the intake means and being operable for pumping the water/contaminant mixture from the surface of the body of water to the reservoir means. Included is a separation means operatively associated with the reservoir means for separating the contaminant from the water. Provision is made for discharge means being operable for pumping at least the separated water from the reservoir means.

In an illustrated embodiment, the surface vessel is an ocean-going ship which has a bow thruster which is operable for laterally controlling the position of the ship.

In another illustrated embodiment the intake means includes a pair of intake pipes, each being pivotally movable relative to the ship and each having a flexible connection to said ship so that said intake means can be maintained in a desired skimming position during ship movement despite rolling seas.

In another illustrated embodiment, the separation means is a clarification system including a plurality of plates linearly spaced apart and vertically staggered which serve to separate the oil from the water.

In another illustrated embodiment the discharge means includes submersible pumping means for pumping either or both of the separated water and contaminant from the ship.

In another illustrated embodiment a plurality of other vessels tow a string of floatable booms to contain the spill and urge the oil toward the ship.

The present invention also contemplates a method for achieving the foregoing functions identified above. The method includes the step of providing a contaminant recovery vessel propellable along a body of water and having a reservoir; the step of positioning a contaminant collecting device forwardly of the vessel for skimming through the surface contaminant as the vessel moves; the step of maintaining skimming positioning of the intake means during ship movement despite rolling seas; the step of providing the collecting device with intake means that extend from the vessel to the surface and which have at least an intake opening formed at a distal end thereof; the step of pumping the water/contaminant to the reservoir by a submersible pumping device in the intake means; the step of separating the contaminant from the water; and, the step of discharging at least the separated water from the reservoir.

Among the other objects and features of the present invention are the provision of an improved contaminant recovery system for use in removing contaminant from the surface of a body of water; the provision of an improved system of the foregoing type which includes a ship which utilizes submersible pumps for withdrawing large quantities of fluid and contaminant into a reservoir aboard a vessel; the provision of an improved system of the foregoing type in which the submersible pumps are maintained below the surface of the water by virtue of their connection to a floating collecting means that is in turn connected to the ship; the provision of a system of the foregoing type wherein the floating collecting means and submersible pumps are automatically raised and lowered relative to the surface of the water; the provision of a system of the foregoing type in which added maneuverability is provided the ship and the collecting means by virtue of a bow thruster associated with the ship; the provision of an improved separating device which comprises a significant portion of the body of the ship; the provision of an improved system of the foregoing type which includes discharge means capable of discharging the separated water and/or the separated contaminant; the provision of an improved system of the foregoing type which includes pump means operable for discharging the separated water so as to provide continuous separation and to avoid overloading of the vessel during separation; the provision of an improved system which utilizes additional ships in front of the main vessel for surrounding, collecting and urging surface contaminant toward the collecting means; the provision of an improved system of the foregoing type which is capable of pumping large quantities of surface water into the ship; and, the provision of an improved method and vessel for use in achieving the foregoing.

Still other objects and further scope of applicability of the present invention will become apparent from the detailed description to follow when taken in conjunction with the accompanying drawings in which like reference numerals indicate like structure throughout the several views.

DETAILED DESCRIPTION

Figure 1:
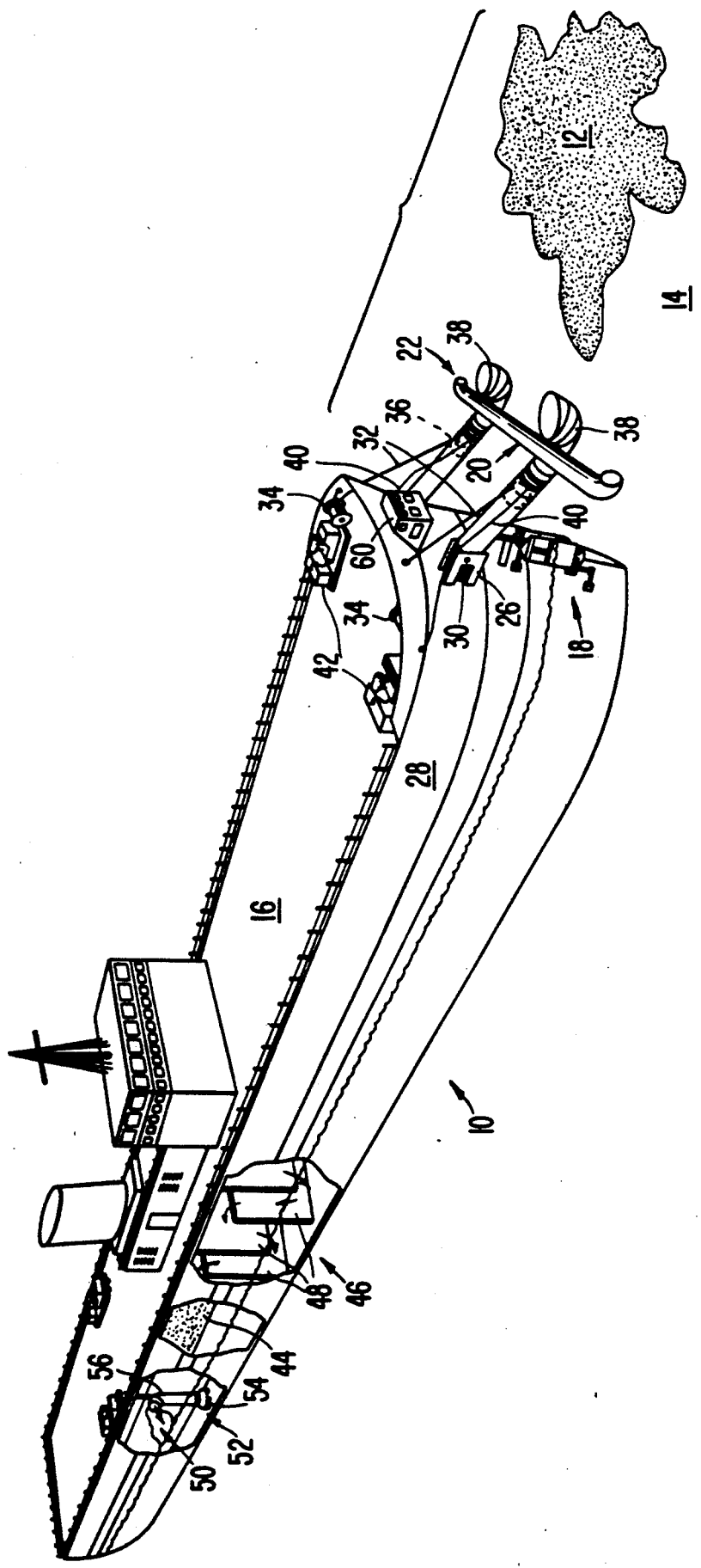
FIG. 1 is a perspective view of one preferred embodiment of the present invention, partly in section, showing details of the invention.
Figure 2:
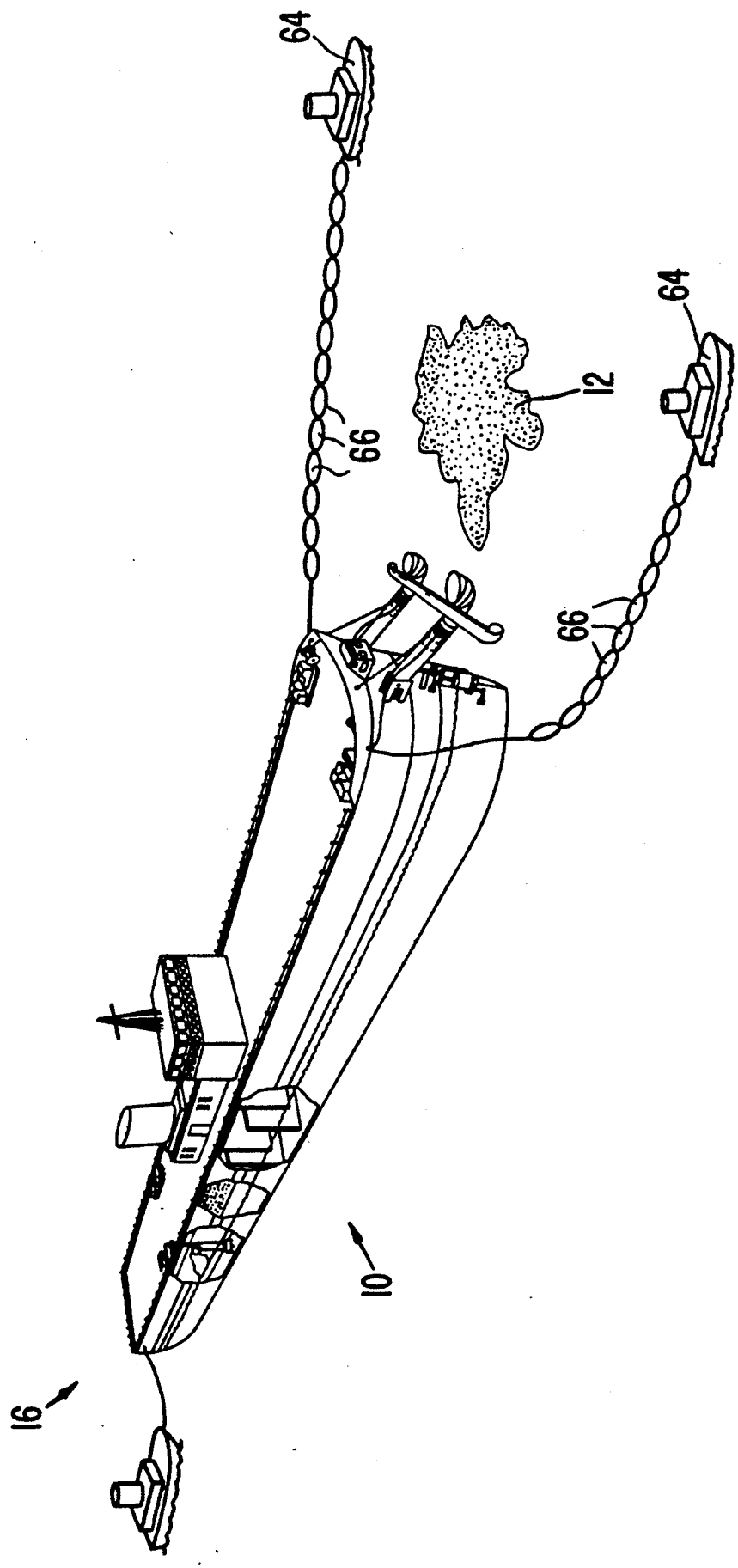
FIG. 2 is a perspective view showing an alternate embodiment of the present invention; and, FIG. 3 is a control system of the present invention shown in block diagram form.
Figure 3:
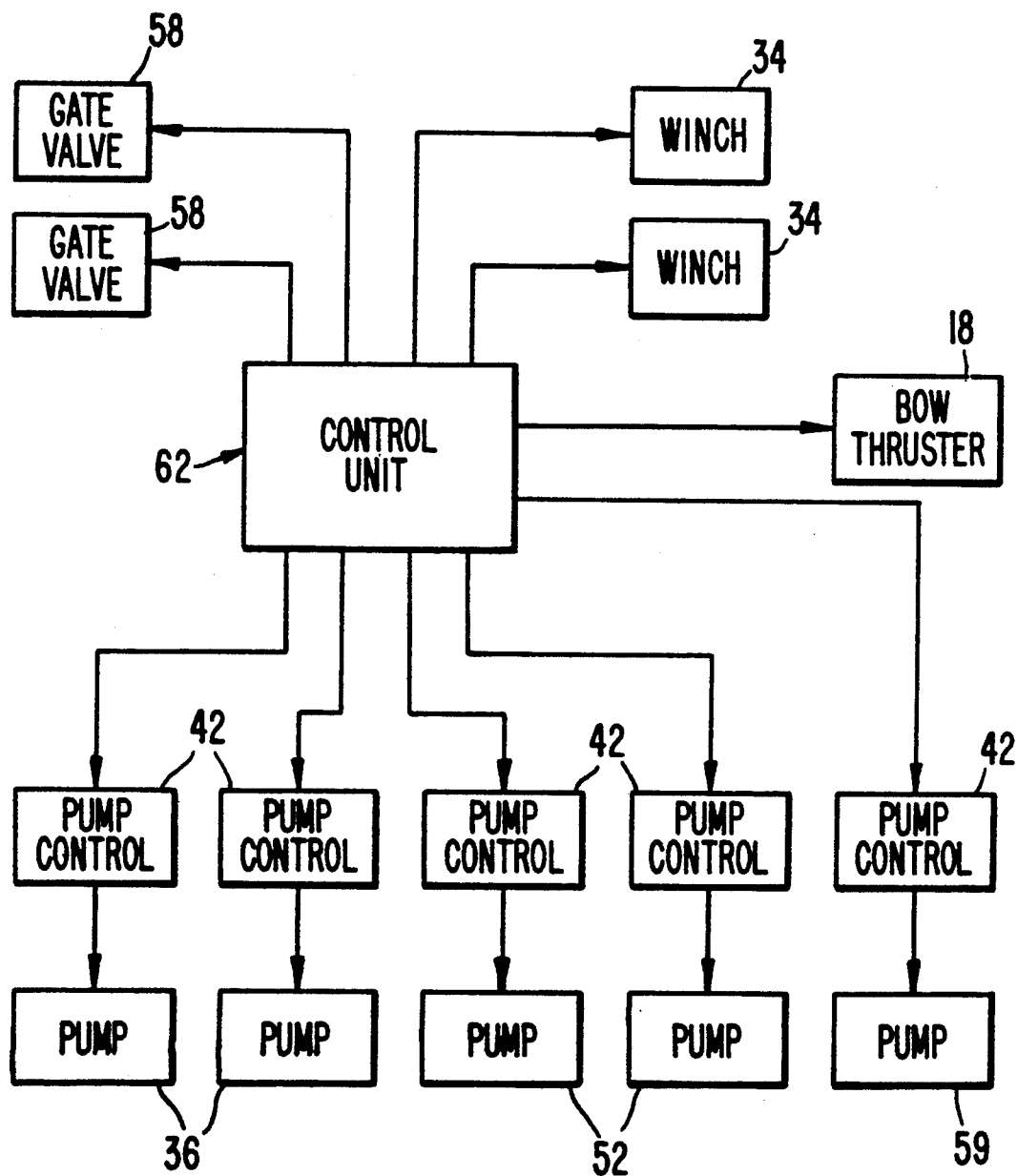

Reference is made to FIGS. 1-3 for illustrating an improved system 10 for recovering a spill of surface contaminants, such as crude oil 12 from the surface of a body of water 14. Included in the system 10 is a self-propelled surface vessel, such as an ocean-going ship 16. Although a self-propelled ship is shown in this embodiment, it will be appreciated that a barge or the like may be used in the recovery process to be described. Only those details of the ship 16 necessary for understanding this invention will be discussed. Connected to the bow of the ship is a portable bow thruster 18 of the type described in U.S. Pat. No. 4,208,978 and its description is incorporated herein by reference. The bow thruster 18 is essentially operable for purposes of laterally positioning the bow of the ship 16 in a manner which will facilitate maneuverability relative to the spill and oil lines coupled to the ship. The bow thruster 18 is retractable to a position above the water line when not in use. In use, the bow thruster is placed in the water and is operated so that water can be selectively thrust from opposite ends to shift the bow in the opposite direction of the thrusts.

Forwardly of the bow, there is provided a floatable oil/water collecting means or assembly 20. The floatable collecting assembly 20 includes an elongated floating means or cylindrical pontoon 22 that is connected to a pair of rigid and corrosion-resistant oil/water intake pipes 24 extending forwardly from the bow. The pontoon 22 can have, for example, a 60 inch diameter and be connected to the intake pipes 24 by reason of known flexible connectors (not shown). Each of the inward ends of the intake pipes 24 is pivotally mounted to a corresponding mounting bracket 26 attached to the ship's bulwark 28 for allowing the pipes to move in vertical planes for reasons which will be discussed. The pivotal intake pipes 24 are fluidly coupled to suitable inboard fluid conduits (not shown) by flexible bellows-type coupling members 30. The pivotal and flexible connection of the intake pipes 24 allows the collecting assembly 20 to continue floating and efficiently removing oil from the surface while the ship is moving despite wave action, especially rolling seas. Consequently, the intake pipes 24 will be automatically raised and lowered in response to wave action and also to settling of the ship owing to the large volumes of oil/water taken into the ship during the separation process. A cable 32 is attached to each intake pipe 24 and can raise and lower them due to the operation of a cable winch 34 so that, for example, the entire collecting assembly can be elevated out of the water.

Disposed within each of the intake pipes 24 in a known manner, is a submersible, variable volume water pump unit, indicated generally by reference numeral 36. The pump is described in U.S. Pat. No. 3,907,463 and its description is incorporated herein by reference. The pumps 36 are patented and obtainable from the M&W Pump Corporation, and are identified as the Model HMF 60 Water Pump. The submersible pumps 36 shown are a mixed flow type, but can also be an axial flow pump which can be mounted in the intake pipe 24 in a known manner. The output of each pump can be varied and can pump upwards of about 125,000 gpm of the oil/water mixture into the ship 16. Each of the pumps 36 has an inverted intake bell 38 which is attached to the free end of the intake pipe 24. The intake bells 38 are supported by the pontoon 22 so as to allow the former to skim vast volumes of the oil/water mixture from the surface of the water. The intake bells 38 can be located slightly below the oil spill 12. Each of the water pumps 36 is operable through hydraulic lines 40 from a drive unit 42 mounted onboard the ship 16. The drive units 42 of the pumps 36 do not, per se, form an aspect of the present invention and, therefore, a detailed description thereof is not necessary for the present invention. However, for purposes of better understanding the present invention, the control or drive unit 42 is described in U.S. Pat. No. 4,350,476 which is herein incorporated by reference. The drive unit 42 is a patented product of the M&W Pump Corporation and is identified as the Model 6000D Drive U it. It will be appreciated that the vertical positioning of the intake bells 38 will vary depending upon sea conditions as well as loading factors of the ship. The skimming position is maintainable automatically because of the floating collecting assembly 20. Since the intake bells 38 are below the oil spill 12 and the pumping capacities are so large, a hydraulic gradient is created which is sufficient to cause the flow into the intake pipes as the ship 14 moves and thereby avoids the oil/water from being pushed from the ship.

Referring back to the ship 16, it includes an extremely large hold or reservoir 44 which extends a substantial amount of the length of the ship. The reservoir 44 must have a large storage volume inasmuch as the pumps 36 can each pump large variable capacities up to 125,000 gpm into the ship. Mounted in the reservoir 44 is a clarification system 46 including a plurality of oil separating plates 48 which are suitably secured to a hold formed by the ship's bulwark. The separation plates 48 are spaced apart in a linear fashion and are vertically staggered relative to each other as shown. The foregoing arrangement serves to separate the water from the crude oil and the separated oil is stored downstream of the plates 48 in the reservoir 44. The present invention contemplates other oil/water separating approaches including a centrifuge type device.

Also according to this invention it is important that there be provided a processed water discharge means or assembly 50 so that the weight of the ship with the pumped water during the recovery process does not overload the ship. Since it is desired to allow the ship 16 to recover the oil as quickly and continuously as possible, the present embodiment utilizes a pair of large variable volume submersible pumps 52 (one of which is shown). These pumps are similar and equal in capacity to the pumps 36 described in connection with the collecting assembly 20. Accordingly, the processed water can be discharged at the same rate it is pumped into the ship. The pumps 52 are vertically oriented so that their intake ends 54 will be adjacent the bottom hold of the ship 16 so as to pump the "cleaned" or separated water. The pump outlet 56, of each is fitted with a flap gate valve 58 (FIG. 3). The ship's bulwark has suitable fittings and ports for permitting discharge of the pumped fluid from the gate valve back to the ocean. Each of the pumps 52 is also operated by a drive unit 42 and is connected thereto by suitable hydraulic lines 40, 40'. Accordingly, large quantities of clean processed water are returned through the gate valve to the body of water 14 while the separated oil 12 is retained in the reservoir 44 for subsequent removal from the ship 16. With the above noted system 10 operating, up to 250,000 gpm can be pumped into and out of the ship 16 with the four pumps operating simultaneously at maximum capacity. The present invention embraces within its scope the use of variable volume pumps having capacities exceeding those noted above for the pumps 36 and 52. Consequently, the configuration of the ship should be such as to be long enough to allow oil/water separation time through the length, and hold several million pounds of the oil/water mixture at any given time.

Other submersible type pumps 59 comparably driven, such as the type noted above, only one of which is shown, are operable to pump the separated oil from the crude oil storage area in the reservoir 44 through suitable fittings (not shown) to tender vessels or to shore facilities. The pumps 59 can operate independently or simultaneously with the pumps 52.

Preferably provided at the bow of the ship 16 is a control cabin 60. The control cabin 60 is provided with a conventional type control unit 62 shown diagrammatically in FIG. 3. In the control cabin 60, an operator can adjust the horizontal and vertical positioning of the collecting assembly 20 by operating the winches as necessary and bow thruster 18 to laterally position the ship 16; operate the speed of pumps 36, 52, 59 to vary their outputs. It is clear that the collecting assembly 20 could be raised should it be desired to have the ship proceed to another location at a fast rate of speed.

Reference is made to FIG. 2 for showing a plurality of smaller vessels 64 which are connected by a string of floatable screens or channeling means with oil recovery booms 66 to the ship 16. The vessels 64 can corral the oil spill by maneuvering the booms 66 in a known manner which collects and directs the oil to the intake pipes 24. Additionally, the invention contemplates having a plurality of tender ships with suitable equipment which can off-load the collected oil being discharged by the pumps 52 or 59.

Although the illustrated embodiment discloses a ocean-going vessel, it will be understood, of course, that the invention contemplates non-ocean going vessels which would accordingly have pumps with appropriate pumping capacities.

After describing the foregoing components forming the present invention it is believed that their operation is self-evident.

According to the present invention it will be recognized that certain changes may be made in the above-described construction and method without departing from the scope of the present invention herein involved. It is intended that all matter contained in this description and shown in the accompanying drawings shall be interpreted as illustrative and not in any limiting sense.

What is claimed is:

1. A system for recovering floating contaminant from the surface of a body of water, said system comprising:
a surface vessel propellable on a body of water, said vessel including reservoir means for receiving the contaminant and water introduced thereinto;
rigid floatable water/contaminant collecting means pivotally connected to and movable with said vessel and including intake means including an intake opening being automatically maintainable in a position for allowing intake of a water/contaminant mixture thereinto during at least vessel movement and submersible pumping means adjacent said intake opening of said intake means and being operable for pumping the water/contaminant mixture to said reservoir means;
separation means operatively cooperable with said reservoir means for separating the contaminant from the water; and,
discharge means being operable for at least pumping the separated water from said reservoir.

2. The system of claim 1 further including means being operable for controlling lateral positioning of said vessel wherein said lateral positioning means includes a bow thruster.

3. The system of claim 1 wherein said collecting means includes a pair of intake pipes, said pumping means being connected to each of said pipes and being operable for varying the rate of the water/contaminant mixture being pumped into said reservoir.

4. The system of claim 3 wherein said surface vessel is a self-propellable, ocean-going ship.

5. The system of claim 4 wherein said reservoir means includes an elongated hold of said ship wherein said hold is capable of holding several million gallons of the water/contaminant mixture.

6. The system of claim 3 wherein said pumping means being operable for providing a pumping rate which is adequate to overcome the effects of typical bow waves forcing the water/contaminant mixture away from said intake means.

7. The system of claim 6 wherein said separation means includes a plurality of generally vertical and spaced apart plates in said hold which are arranged in a vertically staggered fashion so as to effect separation of the water/contaminant mixture.

8. The system of claim 7 wherein said discharge means includes at least a submersible pump which is operable for removing at least the separated water from said hold.

9. The system of claim 3 wherein said pumping means is operable to pump up to about 250,000 gpm.

10. The system of claim 3 wherein said collecting means includes floatation means for allowing said collecting means to float during a recovery process; said floatation means being connected to each of said pipes.

11. The system of claim 1 further including a plurality of other vessels, each having a floatable oil spill containment device connected thereto, said device being connected to said ship, said other vessels being operable to move respective ones of said contaminant devices to contain the oil spill and urge the oil spill to said intake means.

12. The system of claim 1 further including contaminant discharge means for pumping separated contaminant from the vessel to another vessel or to shore facilities.

13. A method of removing contaminant material from the surface of a body of water comprising the steps of:
    providing a contaminant recovery vessel propellable along a body of water and having a reservoir;
    positioning a rigid contaminant collecting device forwardly of the vessel for skimming through the surface contaminant as the vessel moves;
    providing the collecting device with intake means having an intake opening that extend from the vessel to the surface and which have an intake opening formed at a distal end thereof with submersible pumping devices positioned therein adjacent the intake opening;
    pivotally connecting a program end of said intake means to said vessel for maintaining skimming positioning of the intake means despite wave motion;
    pumping the water/contaminant mixture to the reservoir by the submersible pumping devices;
    separating the contaminant from the water; and,
    discharging at least the separated water from the reservoir so as to provide for a generally continuous separating process.

14. The method of claim 13 wherein said step of maintaining skimming is done automatically by buoyancy of the collecting device and providing a flexible and pivotal connection between the intake means and the ship.

15. The method of claim 13 further including the preliminary step of providing a collection and channeling means afloat in the water and being movable by other vessels so as to contain at least a portion of a oil spill and subsequently urge the contained oil to the intake means.

16. The method of claim 13 further comprising the step of selectively laterally positioning the bow of the vessel by means of providing lateral thrusts thereto.

17. The method of claim 13 wherein said discharge step is done simultaneously with said intake pumping.

18. The method of claim 17 wherein the pumping capacities of the intake is generally matched to the pumping capacities of the discharge.

19. The method of claim 18 wherein up to 250,000 gpm is pumped into the ship and 250,000 gpm is discharged from the ship.

20. A surface ship self-propellable on a body of water, said ship comprising:
    reservoir means for receiving the contaminant and water introduced thereto;
    rigid floatable water/contaminant collecting means pivotally connected to and movable with said vessel and including intake means including an intake opening being automatically maintainable in a position for allowing intake of a water/contaminant mixture thereinto and submersible pumping means adjacent said intake opening being cooperable with said intake means and being operable for pumping the water/contaminant mixture to said reservoir means;
    separation means operatively cooperable with said reservoir means for separating the contaminant from the water; and,
    discharge means being operable for at least pumping the separated water from said reservoir means.

21. The ship of claim 20 further including means being operable for controlling lateral positioning of said vessel wherein said lateral positioning means includes a bow thruster.

22. The ship of claim 21 wherein said collecting means includes a pair of intake pipes, said pumping means being connected to each of said pipes and being operable for varying the rate of the water/contaminant mixture being pumped into said reservoir.

23. The ship of claim 22 wherein said self-propellable ship is an ocean-going ship.

24. The ship of claim 23 wherein said reservoir means an elongated hold wherein said hold is capable of holding several million gallons of the water/contaminant mixture.

25. The ship of claim 24 wherein said separation means includes a plurality of generally vertical and spaced apart plates in said hold which are arranged in a vertically staggered fashion so as to effect separation of the water/contaminant mixture.

26. The ship of claim 25 wherein said discharge means includes at least a submersible pump which is operable for removing at least the separated water from said hold.

27. The ship of claim 23 wherein said submersible pumping means is operable for varying the rate of the water/contaminant mixture being pumped into said reservoir.

28. The ship of claim 22 wherein said collecting means includes floatation means for allowing said collecting means to float during a recovery process; said floatation means being connected to each of said pipes.

29. The ship of claim 22 wherein said ship is a non-ocean-going ship.

30. The ship of claim 20 further including contaminant discharge means for pumping the separated contaminant from the ship to other vessels or to shore facilities.

31. A floatable water/contaminant collecting apparatus for use with a surface vessel propellable on a body of water, wherein the vessel includes reservoir means for receiving the contaminant and water introduced thereinto; separation means operatively cooperable with the reservoir means for separating the contaminant from the water; and, discharge means being operable for at least pumping the separated water from the reservoir means wherein said floatable collecting apparatus is connected to the vessel and said apparatus comprises:
    rigid intake means including an intake opening and being pivotally connected to the vessel and automatically maintainable in a position for allowing intake of a water/contaminant mixture thereinto; and
    submersible pumping means cooperable with and adjacent said intake opening of said intake means and being operable for pumping the water/contaminant mixture to the reservoir means.

32. The apparatus of claim 31 wherein said intake means includes a pair of intake pipes, said pumping means being connected to each of said pipes and being operable for varying the rate of the water/contaminant mixture being pumped into said reservoir.

33. The apparatus of claim 32 wherein said pumping means has a pumping rate which is adequate to overcome the effects of bow waves.

34. The apparatus of claim 33 wherein said pumping means is operably to pump up to about 250,000 gpm.

35. The apparatus of claim 34 wherein said collecting means includes floatation means for allowing said collecting means to float during a recovery process; said floatation means being connected to each of said pipes.

* * * * *